(12) United States Patent
Wang et al.

(10) Patent No.: US 11,256,296 B2
(45) Date of Patent: Feb. 22, 2022

(54) FLEXIBLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Wei Wang, Wuhan (CN); Qing Huang, Wuhan (CN)

(*) Notice: Subject to any disclaimer, the term of this patent is extended or adjusted under 35 U.S.C. 154(b) by 343 days.

(21) Appl. No.: 16/610,921

(22) PCT Filed: Apr. 23, 2019

(86) PCT No.: PCT/CN2019/083864
§ 371 (c)(1),
(2) Date: Nov. 5, 2019

(87) PCT Pub. No.: WO2020/124910
PCT Pub. Date: Jun. 25, 2020

(65) Prior Publication Data
US 2021/0333832 A1    Oct. 28, 2021

(30) Foreign Application Priority Data
Dec. 19, 2018    (CN) .......................... 201811553931.9

(51) Int. Cl.
*G06F 1/16*    (2006.01)
*B32B 9/00*    (2006.01)
(Continued)

(52) U.S. Cl.
CPC ............ *G06F 1/1652* (2013.01); *B32B 9/005* (2013.01); *B32B 9/045* (2013.01); *B32B 15/01* (2013.01);
(Continued)

(58) Field of Classification Search
CPC ....... B32B 9/005; B32B 27/281; B32B 15/02; B32B 9/045; B32B 15/01; B32B 2457/20; G06F 1/1652
See application file for complete search history.

(56) References Cited

U.S. PATENT DOCUMENTS 10,865,262 B2 * 12/2020 Mizuochi ................. C08K 5/06
2011/0254009 A1    10/2011 Ohtani et al.
(Continued)

FOREIGN PATENT DOCUMENTS

CN    102667897 A    9/2012
CN    204360712 U    5/2015
(Continued)

*Primary Examiner* — Vinh T Lam

(57) ABSTRACT

The present disclosure provides a flexible display device comprising a display area and a first sector area. The display area is provided with data signal lines therein. The first sector area adopts a wiring structure with double metal layers comprising a first metal layer and a second metal layer layered up and down. The data signal lines transmit a data signal through the first metal layer and the second metal layer in the first sector area. A first insulating layer and a second insulating layer are sequentially disposed between the first metal layer and the second metal layer, and the first metal layer and the second metal layer are partially longitudinally overlapped. The present disclosure provides a flexible display device capable of further reducing a width of its lower frame by reducing an effective width of its first sector area, thereby achieving a design of an ultra-narrow frame display device.

10 Claims, 2 Drawing Sheets

(51) Int. Cl.
 B32B 9/04 (2006.01)
 B32B 15/01 (2006.01)
 B32B 15/02 (2006.01)
 B32B 27/28 (2006.01)

(52) U.S. Cl.
 CPC ............ B32B 15/02 (2013.01); B32B 27/281 (2013.01); B32B 2457/20 (2013.01)

(56) References Cited

U.S. PATENT DOCUMENTS

| | | | |
|---|---|---|---|
| 2012/0009399 A1* | 1/2012 | Nonaka | C09J 7/22 |
| | | | 428/214 |
| 2012/0235713 A1 | 9/2012 | Mori | |
| 2017/0235181 A1 | 8/2017 | Fujikawa | |
| 2019/0164926 A1* | 5/2019 | Seol | H01L 23/49827 |

FOREIGN PATENT DOCUMENTS

| | | | |
|---|---|---|---|
| CN | 105518770 A | 4/2016 |
| EP | 1041622 A1 | 10/2000 |
| JP | S61188522 A | 8/1986 |

\* cited by examiner

FLEXIBLE DISPLAY DEVICE

FIELD OF INVENTION

The present disclosure relates to a field of display technology, and particularly to a flexible display device.

BACKGROUND

It is known that narrow-frame display screens are favored by users because of their high screen ratio, and have become the focus of research and development of display panel enterprises. However, due to layout limitations of a peripheral circuit, narrow design of frames of a display panel is limited.

Specifically, for example, between a display area and a driving chip of the display panel, there are metal traces connecting electrodes of pixel control circuits and the driving chip. The metal traces can be roughly divided into several areas according to their shapes: a first sector area which is formed by signal traces led out from the display area, a first straight-line area which is formed by the signal traces extending downward from the first sector area and is a flexible bending area bent along a bending line, and subsequent second sector area, second straight-line area, and bonding area which are bent downward together with a flexible printed circuit board such that at least one part of the above areas are located below the display area. Therefore, a size of a lower frame can be reduced to some extent. The bending state of the display panel is shown in FIG. 3.

As shown in FIG. 3, the first sector area 110' is still in the same plane as the display area 100', which increases the size of the lower frame. Therefore, how to reduce a width of the first sector area 110' is a difficulty in achieving a lower narrow frame.

Further, in a conventional first sector area, as shown in FIG. 4, a signal trace is composed of a first metal layer 112' deposited in a single layer. The width of the first sector area 110' is mainly determined by the sum of a width W1 of the first metal layer 112' and a distance L1 between adjacent first metal layers 112', i.e. Pitch 1.

In order to reduce the width of the first sector area, the industry has developed a two-layer metal wiring method, as shown in FIG. 5. The two-layer metal wiring method reduces the distance between adjacent first metal layers so that an effective width of the first sector area can be effectively reduced. However, on the other hand, there is only a thin inorganic insulating layer (generally SiNX) 111' between a first metal layer 112' and a second metal layer 114'. Therefore, in order to avoid signal crosstalk between the first metal layer 112' and the second metal layer 114' adjacent to each other, a horizontal distance L3' must be maintained between adjacent metal layers of different layers to ensure that any two metal layers of the upper and lower layers have no overlapping areas in the vertical direction. From this, the distance between adjacent metal layers of the same layer is estimated to be at least: L1'=W2'+2L3'>L1.

Specifically, in one embodiment, typical values are: W1'=W2'=2.5 μm, L1'=2.1 μm, L3'=0.5 μm, and thus Pitch1'>Pitch1. This is not conducive to further reduction of the lower frame.

Therefore, it is necessary to develop a new type of flexible display device to overcome the drawbacks of the prior art.

SUMMARY OF DISCLOSURE

To solve the aforementioned technical problem, the present disclosure provides a flexible display device capable of further reducing a width of its lower frame by reducing an effective width of its first sector area, thereby achieving a design of an ultra-narrow frame display device.

The present disclosure provides a flexible display device comprising a display area and a first sector area. The display area is provided with data signal lines therein. The first sector area adopts a wiring structure with double metal layers comprising a first metal layer and a second metal layer layered up and down. The data signal lines transmit a data signal through the first metal layer and the second metal layer in the first sector area. A first insulating layer and a second insulating layer are sequentially disposed between the first metal layer and the second metal layer, and the first metal layer and the second metal layer are partially longitudinally overlapped.

In an embodiment, the first metal layer and the second metal layer are completely longitudinally overlapped. That is, the center lines of the both coincide in the vertical direction.

In an embodiment, the first metal layer is a triple-layered structure of Ti—Al—Ti. Thicknesses of the three layers of metal may be 60 nm/600 nm/60 nm, respectively.

In an embodiment, the second metal layer is a triple-layered structure of Ti—Al—Ti. Thicknesses of the three layers of metal may be 60 nm/600 nm/60 nm, respectively, but is not limited thereto.

In an embodiment, the first insulating layer is an insulating layer composed of an inorganic material.

In an embodiment, the inorganic material comprises SiNx or SiO2.

In an embodiment, the first insulating layer is a layered structure composed of two different inorganic materials, for example, a double-layered structure composed of a layer of SiNx and a layer of SiO2.

In an embodiment, a thickness of the first insulating layer is 100-200 nm. Preferably, it may be 120 nm, 140 nm, etc.

In an embodiment, the first insulating layer is a portion of an insulating layer disposed in the display area, which extends from the display area to the first sector area.

In an embodiment, the second insulating layer is an insulating layer composed of an organic material.

In an embodiment, the organic material is one of polyimide-based organic materials.

In an embodiment, a thickness of the second insulating layer is 0.5-3 μm. Preferably, it may be 1.2, 1.5, 1.8 μm, etc., but is not limited thereto and can be determined as needed.

In an embodiment, the second insulating layer is a portion of an insulating layer disposed in the display area, which extends from the display area to the first sector area.

In an embodiment, the flexible display device further comprises a first straight line area, a second sector area, a second straight line area, and a bonding area, which are disposed after the first sector. The first straight line area and the second sector area also adopt the wiring structure with the double metal layers comprising the first metal layer and the second metal layer layered up and down. A first insulating layer and a second insulating layer are also sequentially disposed between the first metal layer and the second metal layer.

In an embodiment, the second straight line area adopts a wiring structure with a single metal layer comprising the first metal layer or the second metal layer.

In an embodiment, the second straight line area adopts the wiring structure with the double metal layers comprising the first metal layer and the second metal layer.

In an embodiment, the bonding area adopts the wiring structure with the single metal layer comprising the first metal layer or the second metal layer.

In an embodiment, the bonding area adopts the wiring structure with the double metal layers comprising a first metal layer and a second metal layer.

The flexible display device of the present disclosure has two insulating layers disposed between two metal layers. Due to the presence of the two insulating layers, even if a first metal layer and a second metal layer disposed in the wiring structure with the double metal layers are longitudinally overlapped, no significant parasitic capacitance and signal crosstalk are generated when a signal is transmitted, so that the width of the lower frame can be further shortened.

BRIEF DESCRIPTION OF DRAWINGS

In order to more clearly illustrate the technical solutions in the embodiments of the present disclosure, a brief description of accompanying drawings used in the description of the embodiments of the present disclosure will be given below. Obviously, the accompanying drawings in the following description are merely some embodiments of the present disclosure. For those skilled in the art, other drawings may be obtained from these accompanying drawings without creative labor.

DETAILED DESCRIPTION

The technical solutions of the flexible display device of the present disclosure will be further described in detail below in conjunction with the accompanying drawings and the the embodiments of the present disclosure.

Figure 1:
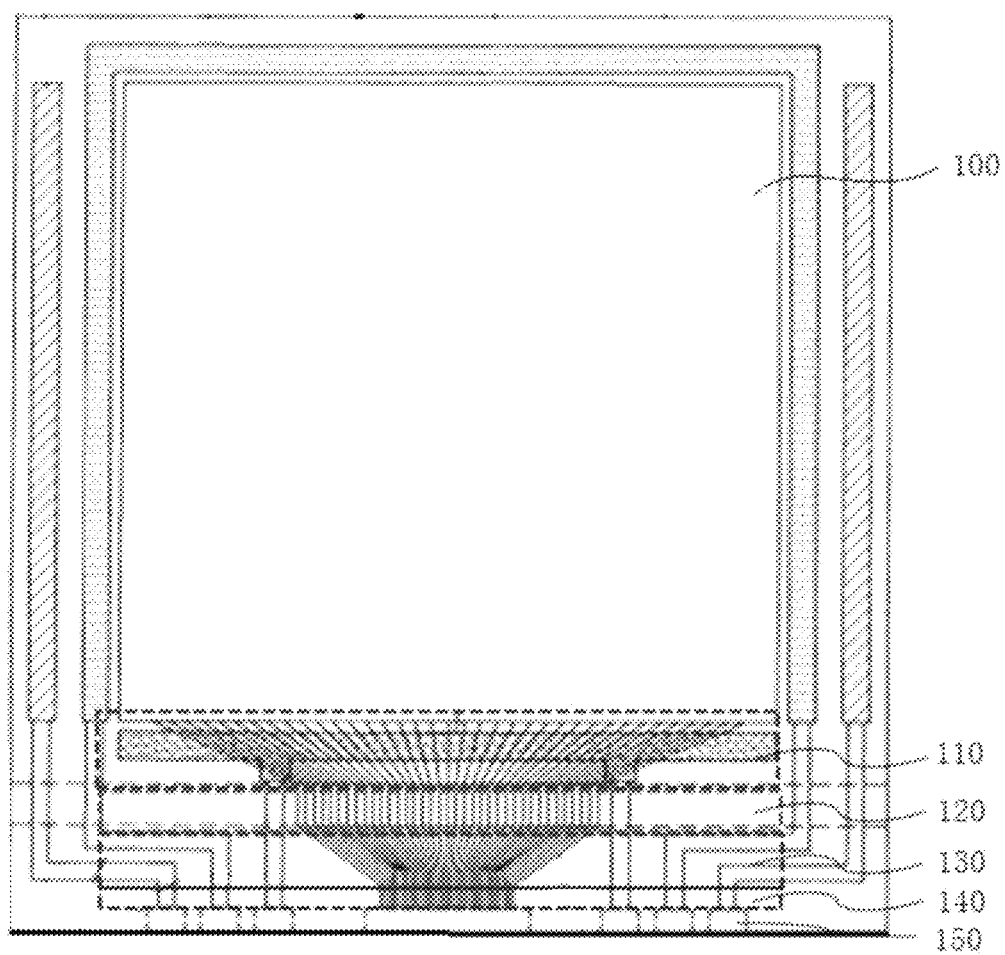
FIG. 1 is a structural schematic diagram of a flexible display device according to an embodiment of the present disclosure.

Please refer to FIG. 1, the present disclosure provides a flexible display device comprising a display area 100 and a first sector area 110, a first straight line area 120, a second sector area 130, a second straight line area 140, and a bonding area 150. The display area 100 is provided with data signal lines therein, and the data signal lines transmit data signals through metal layers disposed in the first sector area 110, a first straight line area 120, a second sector area 130, a second straight line area 140, and a bonding area 150.

Figure 2:
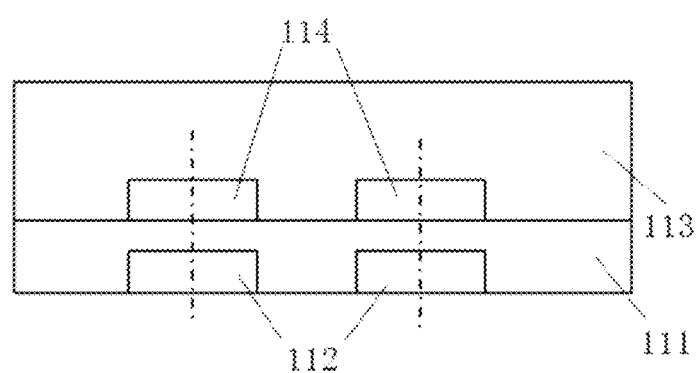
FIG. 2 is a structural schematic diagram of double metal layers disposed in the first sector area of the flexible display device shown in FIG. 1.
Figure 3:
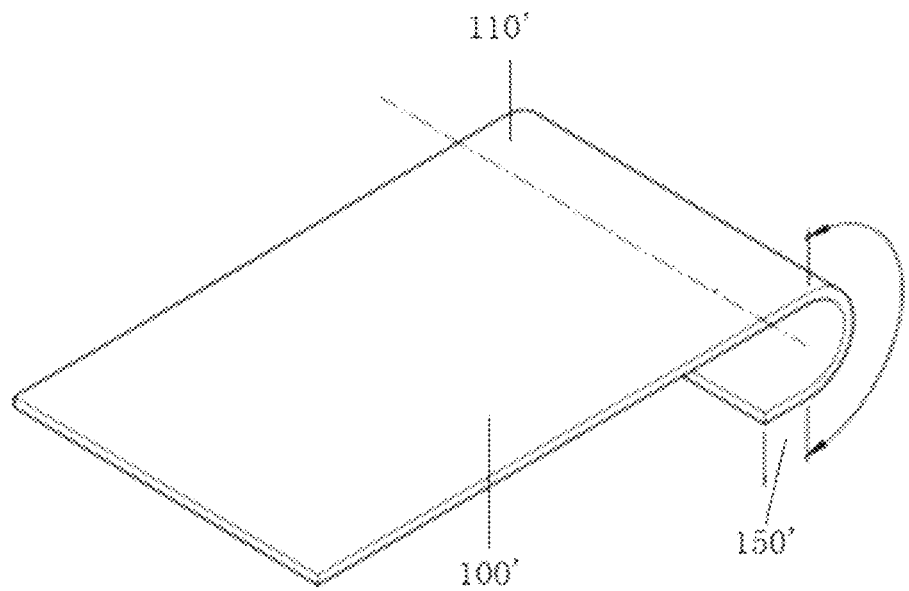
FIG. 3 is a structural schematic diagram of a bending state of a display panel in the prior art.
Figure 4:
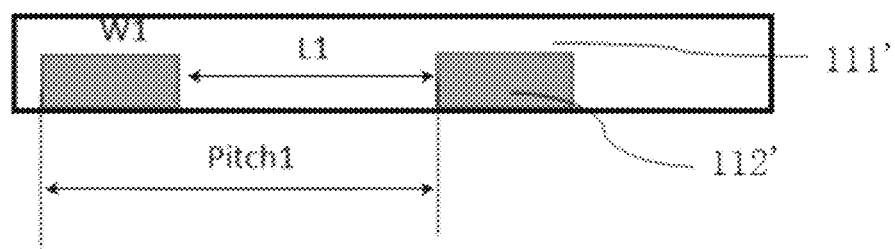
FIG. 4 is a structural schematic diagram of a single metal layer in the prior art.
Figure 5:
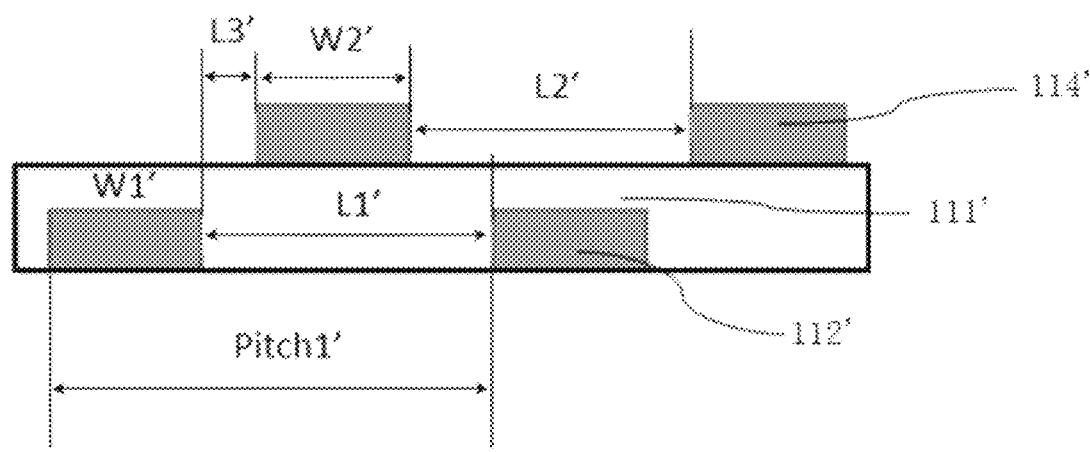
FIG. 5 is a structural schematic diagram of double metal layers in the prior art.

Please refer to FIG. 2, the first sector area 100 adopts a wiring structure with double metal layers comprising a first metal layer 112 and a second metal layer 114 layered up and down. The first metal layer 112 and the second metal layer 114 are completely longitudinally overlapped, i.e. the center lines of the both coincide in the vertical direction. A preferred solution of the disclosure is that the first metal layer 112 and the second metal layer 114 are completely longitudinally overlapped. In other embodiments, as long as the first metal layer 112 and the second metal layer 114 are partially longitudinally overlapped, an effect of reducing a frame can be achieved, but complete longitudinal overlap can make the reducing effect optimal.

The first metal layer 112 is a triple-layered structure of Ti—Al—Ti, and thicknesses of the three layers of metal may be 60 nm/600 nm/60 nm, respectively, but is not limited thereto and can be determined as needed. The second metal layer 114 is a triple-layered structure of Ti—Al—Ti and thicknesses of the three layers of metal may be 60 nm/600 nm/60 nm, respectively, but is not limited thereto and can be determined as needed.

Further, a first insulating layer 111 and a second insulating layer 113 are sequentially disposed between the first metal layer 112 and the second metal layer 114. The first metal layer 112 is disposed in the first insulating layer 111, the upper surface of the first insulating layer 111 is higher than the upper surface of the first metal layer 112, and the second metal layer 114 is disposed on the second insulating layer 113.

The first insulating layer 111 is a single insulating layer or a layered insulating layer composed of an inorganic material, and has a thickness of 100-140 nm, preferably 120 nm. The first insulating layer 111 may be a portion of an insulating layer disposed in the display area 100, which extends from the display area 100 to the first sector area 110, or may be an insulating layer formed separately in the first sector area 110, but is not limited thereto and can be determined as needed. The inorganic material comprises SiNx and/or SiO2, but is not limited thereto and can be determined as needed.

The second insulating layer 113 is an insulating layer composed of an organic material, and has a thickness of 1.2-1.8 μm, preferably 1.5 μm. The second insulating layer 113 may be a portion of an insulating layer disposed in the display area 100, which extends from the display area 100 to the first sector area 110, or may be an insulating layer formed separately in the first sector area 110, but is not limited thereto and can be determined as needed. The organic material is one of polyimide-based organic materials, but is not limited thereto and can be determined as needed.

Further, the first straight-line area 120 and the second sector area 130 also adopt the wiring structure with the double metal layers comprising the first metal layer 112 and the second metal layer 114 layered up and down, and the first insulating layer 111 and the second insulating layer 113 are sequentially disposed between the first metal layer 112 and the second metal layer 114. The structure and material of the double metal layers and the double insulating layers of the first straight-line area 120 and the second sector area 130 are the same as that of the double metal layers and the double insulating layers of the first sector area 110, and details are not described herein again to avoid unnecessary duplication.

The second straight line area 140 may adopt a wiring structure with a single metal layer comprising the first metal layer 112 or the second metal layer 114, or may adopt the wiring structure with the double metal layers as adopted in the first sector area 110, but is not limited thereto and can be determined as needed. The structure and material of the metal layers and the insulating layers of the second straight line area 140 are the same as that of the metal layers and the insulating layers of the first sector area 110, and details are not described herein again to avoid unnecessary duplication.

The bonding area 150 may adopt the wiring structure with the single metal layer comprising the first metal layer 112 or the second metal layer 114, or may adopt the wiring structure with the double metal layers, but is not limited thereto and can be determined as needed. The structure and material of the metal layers and the insulating layers of the bonding area 150 are the same as that of the metal layers and the insulating layers of the first sector area 110, and details are not described herein again to avoid unnecessary duplication.

The flexible display device of the present disclosure has two insulating layers disposed between two metal layers. Due to the presence of the two insulating layers, even if a first metal layer and a second metal layer disposed in the wiring structure with the double metal layers are longitudinally overlapped, no significant parasitic capacitance and signal crosstalk are generated when a signal is transmitted, so that the width of the lower frame can be further shortened.

The present disclosure has been disclosed in the above preferred embodiments, but the preferred embodiments are not intended to limit the present disclosure, and those skilled in the art may make various modifications without departing from the scope of the present disclosure. The protective scope of the present disclosure is determined by the claims.

The technical scope of the present disclosure is not limited to the above description of embodiments, and those skilled in the art can make various modifications to the above embodiments without departing from the technical idea of the present disclosure. The modifications are all within the scope of the present disclosure.

What is claimed is:

1. A flexible display device, comprising a display area and a first sector area, wherein the display area is provided with data signal lines therein, the first sector area adopts a wiring structure with double metal layers comprising a first metal layer and a second metal layer layered up and down, the data signal lines transmit a data signal through the first metal layer and the second metal layer in the first sector area;
    wherein a first insulating layer and a second insulating layer are sequentially disposed between the first metal layer and the second metal layer, and the first metal layer and the second metal layer are partially longitudinally overlapped.

2. The flexible display device according to claim 1, wherein the first metal layer and the second metal layer are completely longitudinally overlapped.

3. The flexible display device according to claim 1, wherein the first metal layer is a triple-layered structure of Ti—Al—Ti.

4. The flexible display device according to claim 1, wherein the second metal layer is a triple-layered structure of Ti—Al—Ti.

5. The flexible display device according to claim 1, wherein the first insulating layer is an insulating layer composed of an inorganic material, and wherein the inorganic material comprises SiNx or SiO2.

6. The flexible display device according to claim 1, wherein the first insulating layer is a layered structure in which each layer is composed of SiNx or SiO2.

7. The flexible display device according to claim 1, wherein a thickness of the first insulating layer is 100-200 nm.

8. The flexible display device according to claim 1, wherein the second insulating layer is an insulating layer composed of an organic material, and wherein the organic material is one of polyimide-based organic materials.

9. The flexible display device according to claim 1, wherein a thickness of the second insulating layer is 0.5-3 µm.

10. The flexible display device according to claim 1, further comprising a first straight-line area, a second sector area, a second straight-line area, and a bonding area, which are disposed after the first sector; wherein the first straight-line area and the second sector area adopt the wiring structure with the double metal layers comprising the first metal layer and the second metal layer layered up and down; wherein a first insulating layer and a second insulating layer are sequentially disposed between the first metal layer and the second metal layer.

* * * * *